(12) United States Patent
Kwak

(10) Patent No.: US 11,216,826 B2
(45) Date of Patent: Jan. 4, 2022

(54) SYSTEM AND METHOD FOR CERTIFYING GENUINE PRODUCT AND GENERATING MUSIC CHART FOR COPYRIGHT PROTECTION

(71) Applicant: HANTEO CHART, Inc., Seoul (KR)

(72) Inventor: Young Ho Kwak, Gyeonggi-do (KR)

(73) Assignee: HANTEOGLOBAL CO., LTD., Seoul (KR)

( * ) Notice: Subject to any disclaimer, the term of this patent is extended or adjusted under 35 U.S.C. 154(b) by 179 days.

(21) Appl. No.: 16/555,270

(22) Filed: Aug. 29, 2019

(65) Prior Publication Data
US 2020/0151737 A1 May 14, 2020

(30) Foreign Application Priority Data
Nov. 9, 2018 (KR) .......................... 10-2018-0137052

(51) Int. Cl.
| G06Q 99/00 | (2006.01) |
| G06Q 30/00 | (2012.01) |
| G06K 19/06 | (2006.01) |
| G06K 7/14 | (2006.01) |

(52) U.S. Cl.
CPC ......... *G06Q 30/018* (2013.01); *G06K 7/1417* (2013.01); *G06K 19/06037* (2013.01)

(58) Field of Classification Search
CPC ............... G06Q 30/018; G06K 7/1417; G06K 19/06037
USPC ........................................................ 705/317
See application file for complete search history.

(56) References Cited

U.S. PATENT DOCUMENTS

| 2005/0038819 | A1* | 2/2005 | Hicken | G06F 16/683 |
| 2007/0156534 | A1* | 7/2007 | Lerner | G06Q 30/0267 |
| | | | | 705/14.64 |
| 2011/0209224 | A1* | 8/2011 | Gentile | G06F 21/10 |
| | | | | 726/27 |
| 2012/0042385 | A1* | 2/2012 | Risan | G06F 21/10 |
| | | | | 726/26 |
| 2013/0091458 | A1* | 4/2013 | Kang | G06F 3/0482 |
| | | | | 715/784 |
| 2016/0323107 | A1* | 11/2016 | Bhogal | H04L 9/3247 |
| 2017/0289202 | A1* | 10/2017 | Krasadakis | H04L 65/60 |

* cited by examiner

*Primary Examiner* — Ahshik Kim
(74) *Attorney, Agent, or Firm* — Revolution IP, PLLC

(57) ABSTRACT

A method for certifying a genuine product and generating a music chart performed by a server may include: receiving a genuine product certification request from a terminal of a buyer who purchased an album; transmitting genuine product certification content for a genuine product certification procedure to the terminal in response to the genuine product certification request; receiving certification information input to the genuine product certification content; comparing the received certification information with information stored in a database built in advance to perform genuine product certification for the album; matching the certification information with the album when the album is certified as a genuine product, storing the matched certification information in the database, and transmitting a certification completion message to the terminal; and generating the music chart based on the certification information. The certification information may include unique identification information of the album and personal information of the buyer.

11 Claims, 12 Drawing Sheets

FIG. 5
| Security Code | Employment Number | Certified country | Certification Date | Authentication IP |
|---|---|---|---|---|
| 97SJ545JK3R4U73 | K000000082 | Vietnam | 2018-10-13 11:38:37 | 59.153.255.175 |
| 33MF732GP2P7C99 | K000000083 | Vietnam | 2018-10-13 11:40:59 | 59.153.255.175 |
| 75YF557PC7N8T56 | K000000087 | Vietnam | 2018-10-13 11:36:09 | 59.153.252.13 |
| 95AZ766NL9M3J72 | K000000121 | Thailand | 2018-10-26 23:05:22 | 49.48.113.7 |
| 39KT758HQ3K9897 | K000000122 | Thailand | 2018-10-25 23:36:59 | 184.22.209.2 |
| 47UM335KK6M3N52 | K000000126 | Thailand | 2018-10-23 19:22:13 | 223.24.62.50 |
| 45KR597MW2V3K24 | K000000134 | Canada | 2018-10-22 09:18:00 | 72.141.3.202 |
| 59GP37BNU9E5L63 | K000000135 | Canada | 2018-10-22 09:22:24 | 72.141.3.202 |
| 97PX9B9AN9N7X72 | K000000142 | Malaysia | 2018-11-02 01:11:38 | 183.171.185.33 |
| 64BJ847MA8T3Q53 | K000000164 | Malaysia | 2018-11-05 13:48:17 | 14.192.215.32 |
| 73HG423NA3J4222 | K000000178 | Hong Kong | 2018-10-19 19:50:01 | 61.238.13.5 |
| 56QZ436NJ7W3O88 | K000000179 | Hong Kong | 2018-10-19 20:04:23 | 61.238.13.5 |
| 36GX923FD9E7H87 | K000000180 | Hong Kong | 2018-10-23 19:47:48 | 119.247.31.243 |
| 93XH785CM6Z3Y26 | K000000181 | Hong Kong | 2018-10-23 19:48:47 | 119.247.31.243 |
| 38LQ857QB7A5N75 | K000000188 | Hong Kong | 2018-10-19 19:38:32 | 61.238.13.5 |
FIG. 6
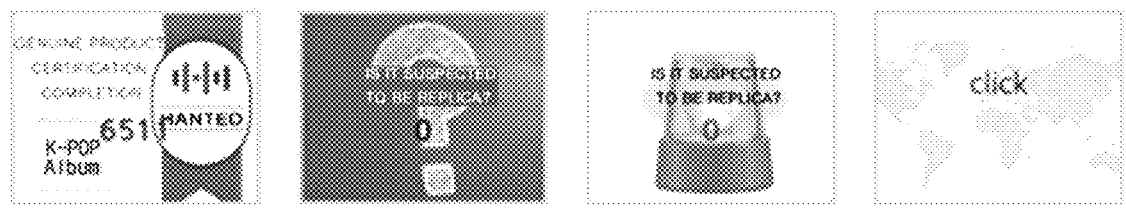
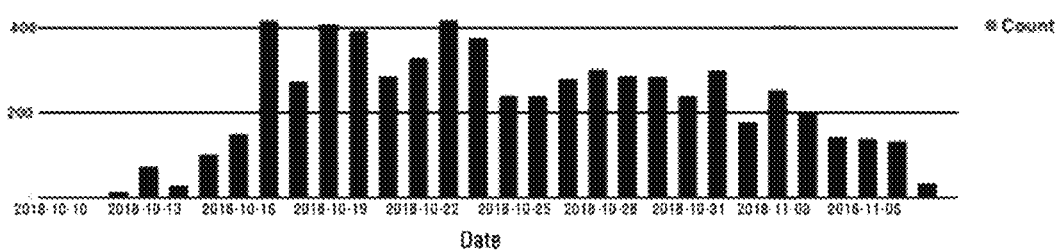

SYSTEM AND METHOD FOR CERTIFYING GENUINE PRODUCT AND GENERATING MUSIC CHART FOR COPYRIGHT PROTECTION

BACKGROUND OF THE INVENTION

Field of the Invention

The present invention relates to a system and a method for certifying a genuine product and generating a music chart for copyright protection, and more particularly to a system and a method for collecting information through genuine product certification of an album buyer in real time and generating a music chart by reflecting the collected information to provide a service with high reliability and accuracy.

Related Art

Currently, markets of multimedia products in various forms such as a compact disc (hereinafter referred to as a CD), a digital video disk (hereinafter referred to as a DVD), a universal serial bus (hereinafter referred to as a USB), a music card, and the like are actively developed. A music file and a photo or video (music video) of an artist, and related products are produced on the CD, DVD, USB, MC, or the like as a single album and sold (hereinafter, the CD, DVD, USB, MC, or the like are collectively referred to as an album). However, data and products contained in such album may be easily copied and a damage to a copyright holder by illegal copying is serious.

In one example, a record/music video industry may be classified into a management company (hereinafter, referred to as a record/music video management company) that leads overall projects such as support for singers from the management company, selection/cast of a composer, selection of music genre, record recording/video shooting, or the like until the record/music video is released, a production company that produces a record/music video CD product, and a vending company (seller) that sells the record/music video CD product.

In a conventional business scheme, the record/music video management company could not directly obtain information about customers who actually purchased the record/music video CD product, although the record/music video management company plan-managed their own work (record or music video).

In other words, when the record/music video CD product is sold by an offline transaction, the customer does not write personal information thereof. Further, even though the record/music video CD product is sold online, since the management company and the vending company are separated from each other as described above, the record/music video CD product management company may not be able to directly and rapidly recognize the information about the customer who actually purchased the product.

Further, in the conventional business scheme, the management company does not directly participate in a sale of the CD product. Therefore, there was no tool to prevent an economic damage due to illegal distribution gains obtained by manipulating sales results and an inaccurate sale statistics.

In one example, in keeping with a globalization trend of K-POP, in order for the K-POP to enter a world music market, which is relatively free from a linguistic barrier of a cultural product, globalization of a music database is an important task. Therefore, there is a need for a high-level intelligent tool of a decision support system (DSS) concept that predicts new trends based on precise statistical data and analyzes a future market.

Currently, a large number of music-related Internet companies are also preparing revenue creation via customer relationship management (CRM) and on line analytical processing (OLAP), and ultimately preparing a new era of utilization of advanced management tools such as a decision support system (DSS), an executive information system (EIS), or the like. However, in record data modeling of most companies, data of tables of entity, relationship, and fact, which are the basis of the record data modeling is not optimized to represent characteristics of the record and is inaccurate. Therefore, even reliability of an analysis result obtained using a high-level data warehousing system could be lowered when it is based on such record data modeling.

In addition, conventionally, distortion of sale data affects a ranking of the record chart, and thus reliability of the record chart could not be guaranteed.

SUMMARY OF THE INVENTION

The present invention is provides a system and a method for certifying a genuine product and generating a music chart for copyright protection that may collect information through genuine product certification of an album buyer in real time and reflect the collected information on a music chart to secure reliability and accuracy, increase inventory management efficiency for an album seller via accurate sales situation and demand forecast by region and country, and promote the copyright protection for a record producer.

The technical problems to be solved by the present embodiment are not limited to the aforementioned problems, and any other technical problems may be deduced from the following embodiments.

In an aspect, a method for certifying a genuine product and generating a music chart performed by a server is provided. The method includes: receiving a genuine product certification request from a terminal of a buyer who purchased an album; transmitting genuine product certification content for a genuine product certification procedure to the terminal in response to the genuine product certification request; receiving certification information input to the genuine product certification content; comparing the received certification information with information stored in a database built in advance to perform genuine product certification for the album; matching the certification information with the album when the album is certified as a genuine product, storing the matched certification information in the database, and transmitting a certification completion message to the terminal; and generating the music chart based on the certification information, wherein the certification information includes unique identification information of the album and personal information of the buyer, and wherein the performing of the genuine product certification includes comparing the unique identification information with the information stored in the database.

In one implement, the album may have a genuine product certification hologram or a QR code assigned with a unique identification number, wherein the unique identification number and the QR code may be respectively covered with a scratch layer such that the unique identification number and the QR code are not exposed to outside, wherein information about the unique identification number and the QR code may be stored in advance, and wherein the receiving of the genuine product certification request may include accessing, by the terminal, the server by reading the QR code using the terminal.

In one implement, the genuine product certification content may be configured to input the unique identification information, a date of birth, a gender, and a region of the buyer, and wherein the certification information may be transmitted to the server via GPS communication.

In one implement, the storing of the matched certification information and the transmitting of the certification completion message to the terminal may include further storing a certification time in the database, wherein the generating of the music chart may include reflecting the certification information on the music chart in real time and displaying the music chart.

In one implement, the generating of the music chart may include generating a map marked with regions, countries, cities of the buyers who purchased the album.

In one implement, the generating of the music chart may include generating an analyzation result of gender distribution and age distribution of the buyers who purchased the album based on the certification information.

In one implement, the method may further include forecasting a demand for the album based on data collected from the certification information, wherein the forecasting of the demand may include forecasting a demand for the album by region, country, and city by reflecting a past certification history for a predetermined period and information currently being certified in real time with reference to data of population, age, and gender in the region, country, and city.

In one implement, the method may further include offering the buyer a reward for the genuine product certification, wherein the offering of the reward may include transmitting at least one of a new album discount coupon or a bromide paper voucher to the terminal or transmitting a message, to the terminal, indicating that a certain amount of money is saved to donate money under a name of an artist of the corresponding album.

In one implement, the method may further include transmitting a message indicating that the album is suspected to be a replica or a fake to the terminal when the album is not certified as the genuine product and receiving reporting information.

In another aspect, a system for certifying a genuine product and generating a music chart is provided. The system includes: a terminal of a buyer who purchased an album assigned with unique identification information; a server connected to the terminal for genuine product certification of the album; and a database storing information corresponding to the unique identification information, wherein the unique identification information includes a genuine product certification hologram and a QR code assigned with a unique identification number, wherein the unique identification number and the QR code respectively include a scratch layer such that the unique identification number and the QR code are not exposed to outside, wherein the server is configured to: receive a genuine product certification request from the terminal; transmit genuine product certification content for a genuine product certification procedure to the terminal; receive certification information input through the genuine product certification content; compare the received certification information with the information stored in the database to perform genuine product certification; match the certification information with the album when the album is certified as a genuine product and store the matched certification information in the database; and generate the music chart based on the certification information.

In one implement, the certification information may include the unique identification number of the album, a date of birth, a gender, and a region of the buyer, and wherein the music chart may include a map marked with regions, countries, cities of buyers who purchased the album and an analyzation result of gender distribution and age distribution of the buyers who purchased the album.

First, according to the present invention, information through the genuine product certification of the album buyer may be collected in real time, reflected on the music chart, and serviced, so that reliability and accuracy may be ensured.

Second, according to the present invention, the album sales by region, country, gender, age, and the like may be identified, so that the album supplier may achieve smooth supply and improve inventory management efficiency through precise sales situation and demand forecast by scope.

Third, conventionally, since the buyer had to verify whether the product is genuine with a written guarantee of quality or the like, which is relatively easy to counterfeit, a reliability of the genuine product verification was low. However, according to the present invention, the buyer may easily distinguish whether the product is the genuine product via the genuine product certification from the central management platform server without having to install a separate application on the user terminal, thereby increasing the reliability.

Fourth, active participation of participants may be encouraged through a reward for the genuine product certification, a reporting system, and a campaign and illegal copy or sales may be prevented to promote the copyright protection for a music file producer.

Fifth, according to the present invention, since the genuine product certification is performed by inputting basic information of the customer, after-sales customer management is possible.

Sixth, the information about the customer who purchased the album may be directly and rapidly recognized and accurate sales status may be recognized. Further, information such as preferences by stratum, age, gender, and the like of the customer who actually purchased the product may be directly and rapidly recognized. Thus, the special service may be provided to efficiently perform the customer relationship management and commercial transaction.

The effects of the present invention are not limited to those mentioned above, and other technical problems may be clearly understood by those skilled in the art from a following description.

BRIEF DESCRIPTION OF THE DRAWINGS

FIG. 5 illustrates a data table of certification data stored in a genuine product certification step, according to an embodiment.

FIGS. 6 and 7 respectively illustrate certification statistics by time period in a genuine product certification step, according to an embodiment.

DESCRIPTION OF EXEMPLARY EMBODIMENTS

In the following, some embodiments will be described in detail and with reference to the accompanying drawings in order that those skilled in the art to which the present invention belongs may easily implement the present invention.

Hereinafter, a method for certifying a genuine product and generating a music chart for copyright protection according to a preferred embodiment of the present invention will be described in detail with reference to the accompanying drawings. A term 'album', which will be described below, should be construed as a term collectively referring to hardware means containing music data that may be sold offline.

Figure 1:
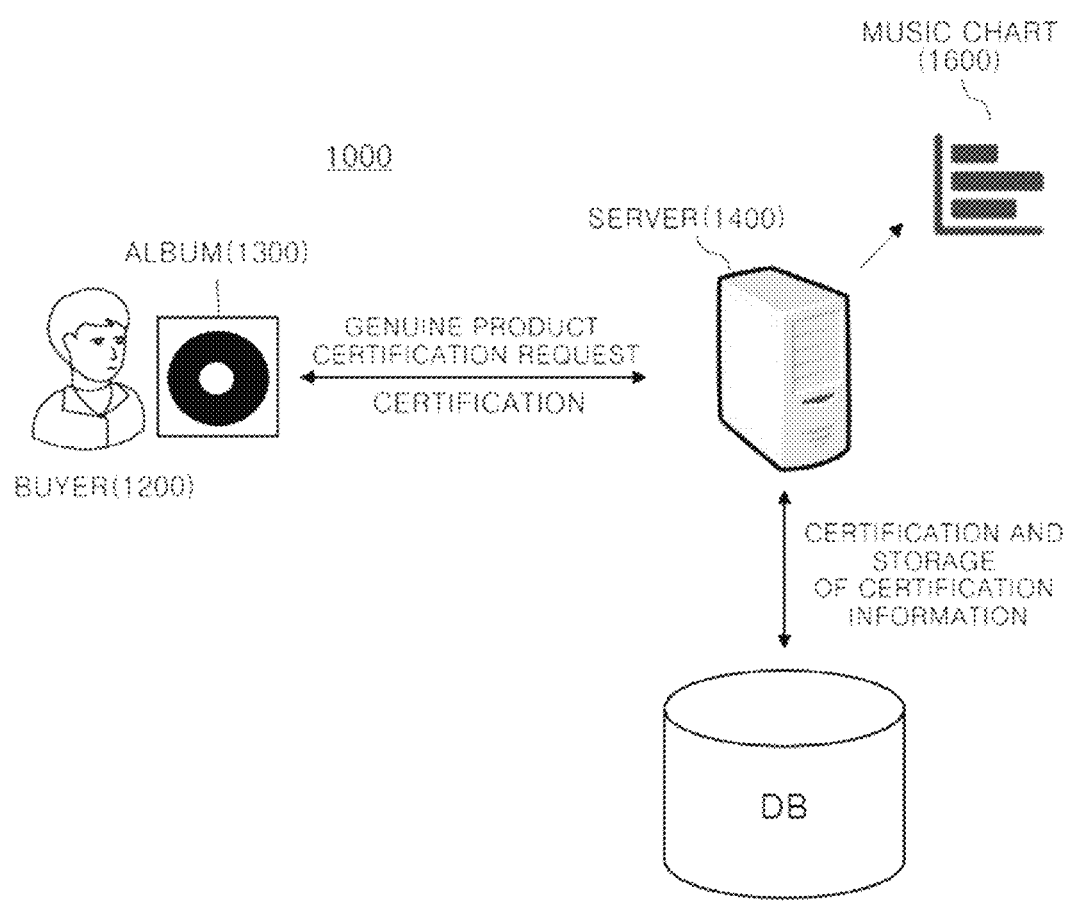
FIG. 1 illustrates a system for certifying a genuine product and generating a music chart according to an embodiment.

FIG. 1 illustrates a system for certifying a genuine product and generating a music chart according to an embodiment.

Referring to FIG. 1, a system 1000 for certifying a genuine product and generating a music chart may include a buyer 1200 that purchased an album 1300, a server 1400, and a database (DB) running on the server 1400.

The server 1400, which is a central management platform that directs a service for certifying a genuine product and generating a music chart, may be operated by a genuine product certification and music chart generation service provider. According to one embodiment, the server 1400 may include the database (DB) for managing information about albums and information about buyers who purchase the albums, or may be connected to an external database (DB). That is, the database (DB) may be located inside or outside the server 1400.

The album 1300 purchased by the buyer 1200 may include unique identification information assigned by a management company or a vending company for genuine product certification. For example, each of the albums may be provided with a genuine product certification hologram, a unique identification number, a QR code assigned with a unique identification number, and/or a QR code having a unique identification mark. Further, the unique identification number and/or the QR code may be covered with a scratch layer such that the unique identification number and/or the QR code are not exposed to the outside. The unique identification information such as the unique identification number or the QR code may be stored in the database (DB) of the server 1400 in advance.

Figure 3:
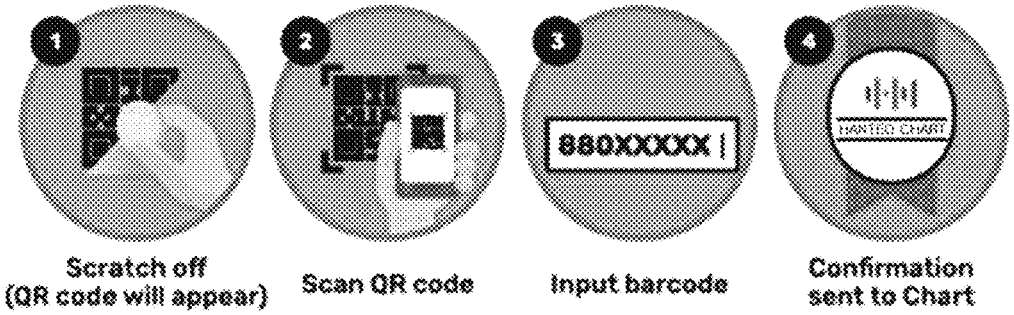
FIG. 3 is a diagram for describing a genuine product certification process of an album, according to an embodiment.
Figure 3:

The buyer 1200 who purchased the album 1300 may request the genuine product certification to the server 1400 via a terminal (e.g., smartphone) (not shown) or a PC thereof. Further, the server 1400 may perform the genuine product certification in response to the genuine product certification request. The server 1400 may store certification information in the database (DB) and generate a record chart 1600 based on the certification information. FIG. 3 illustrates a screen for guiding a genuine product certification process for an album in a method for certifying a genuine product and generating a music chart for copyright protection that may be provided to the buyer 1200, according to an embodiment.

Figure 2A:
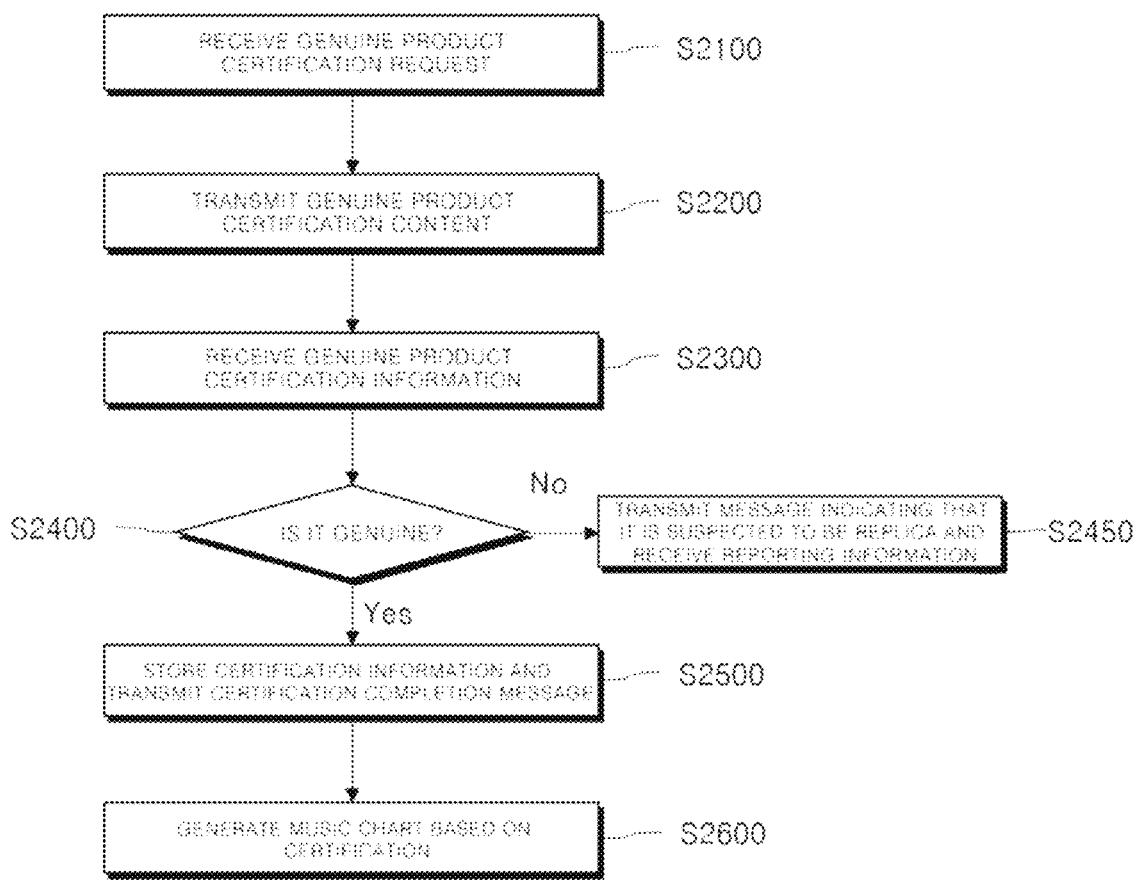
FIGS. 2A and 2B respectively illustrate flowcharts of a method for certifying a genuine product and generating a chart for copyright protection, according to an embodiment.

FIG. 2A illustrates a flowchart of a method for certifying a genuine product and generating a music chart performed on a server, according to one embodiment. The flowchart of FIG. 2A may be performed by the server 1400 of FIG. 1, but is not limited thereto.

Referring to FIG. 2A, in S2100, the server 1400 may receive the genuine product certification request from the terminal of the buyer 1200. According to one embodiment, the buyer 1200 delivers the request of the genuine product certification of the album 1300 to the server 1400 via the terminal (e.g., smartphone) thereof and the server 1400 may receive the request. According to one embodiment, the buyer 1200 may access the server 1400 through a predetermined Internet link. Alternatively, the buyer 1200 may read/recognize a QR code included on the album 1300 via a user terminal (terminal having a QR code recognition function), so that the terminal may access the server 1400 based on information of the QR code.

Figure 4A:
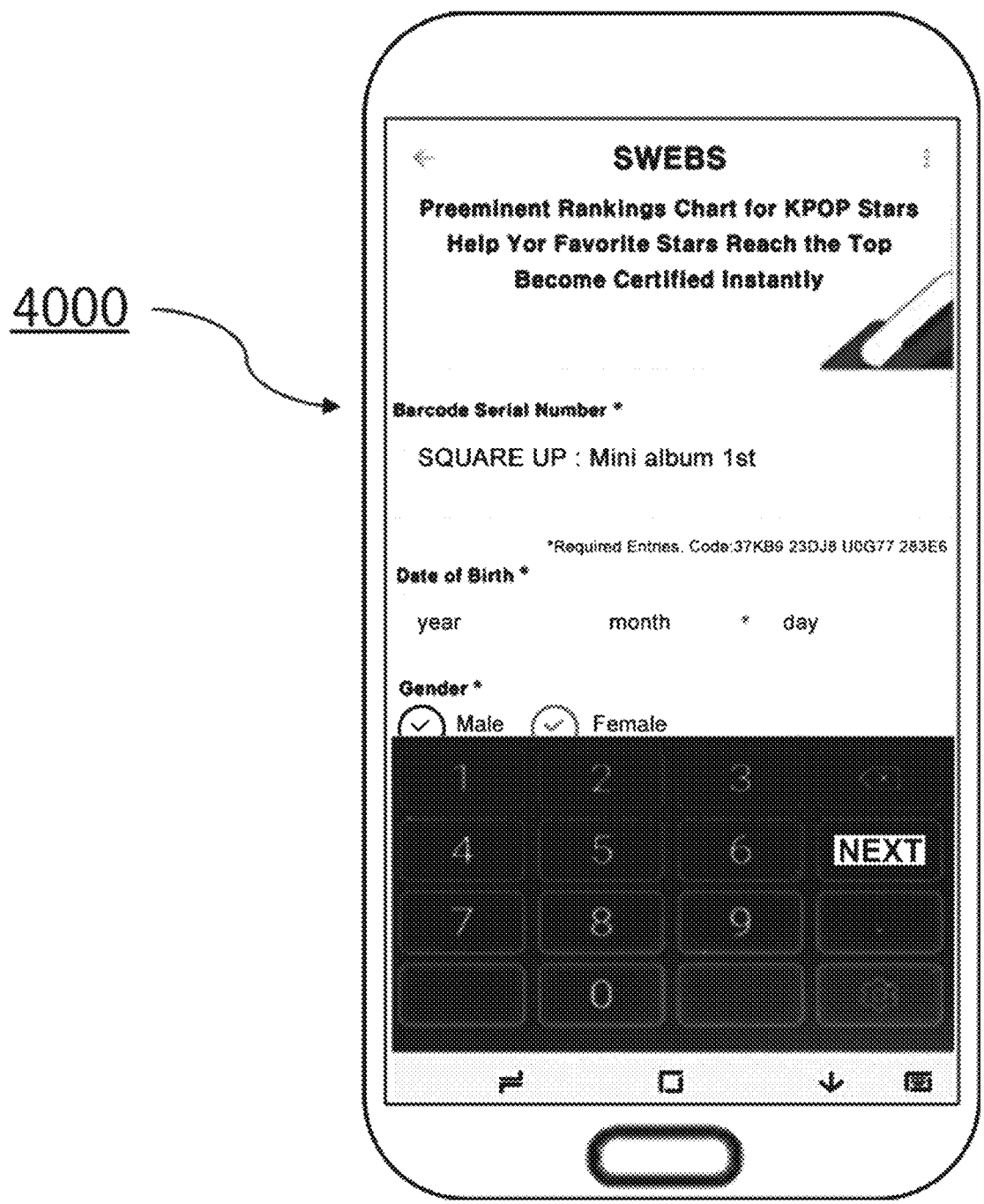
FIG. 4A is a screen displayed on a user terminal of an album buyer for inputting information for a genuine product certification, according to an embodiment.

In S2200, the server 1400 may transmit genuine product certification content for a genuine product certification procedure to the terminal of the buyer 1200. The genuine product certification content for input of certification information may be displayed on a screen of the terminal of the buyer 1200. The certification information may include unique identification information of the album 1300 and personal information of the buyer 1200. The genuine product certification content may include a box (e.g., edit box) for inputting unique identification information assigned to the album 1300 and/or the personal information of the buyer 1200. The personal information of the buyer 1200 may include information such as a date of birth, gender, age, a residential area, or the like of the buyer 1200. According to one embodiment, when the buyer 1200 accesses the server 1400 via the QR code, a box of the unique identification information of the album 1300 of the genuine product certification content may be automatically filled. FIG. 4A is an example of a screen displayed on a user terminal 4000 for inputting information for the genuine product certification.

Referring to FIG. 2A again, in S2300, the server 1400 may receive the certification information input into the genuine product certification content. According to one embodiment, the certification information may be collected in real time from the terminal of the buyer 1200 via GPS communication to the central management platform.

Figure 7:
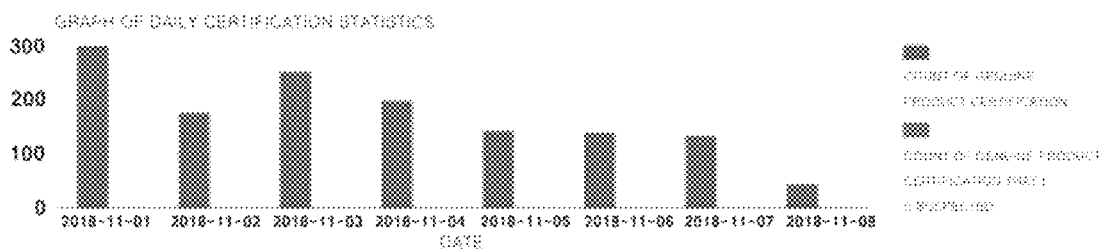
Figure 8:
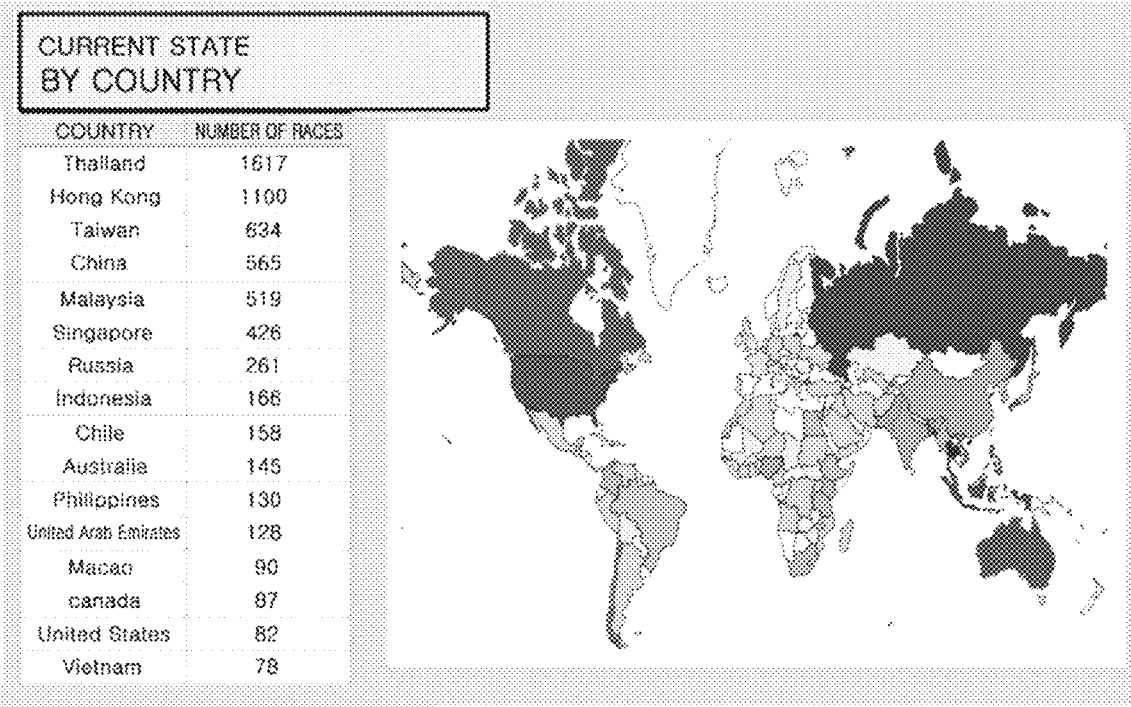
FIG. 8 illustrates certification statistics by country, according to an embodiment.
Figure 9:
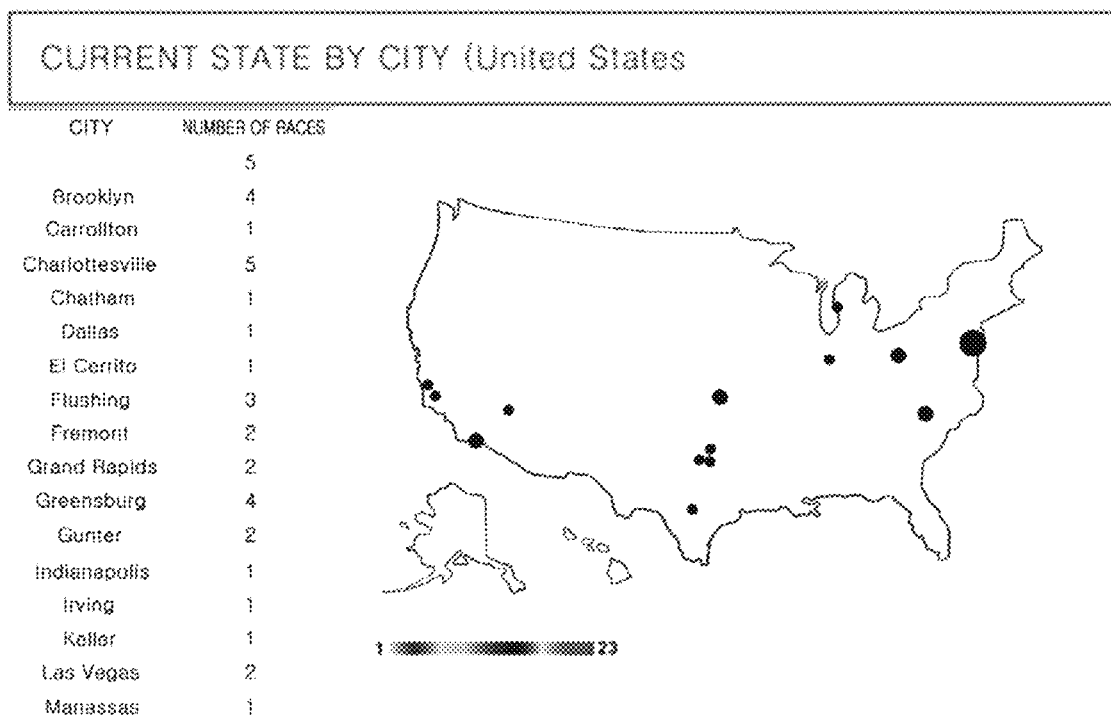
FIG. 9 illustrates certification statistics by city, according to an embodiment.

In S2400, the server 1400 may perform the genuine product certification. The server 1400 may compare the certification information received in S2300 with information stored in the pre-established database (DB) (DB information) to perform the genuine product certification. For example, when the received certification information matches the DB information (or there is DB information that matches the received certification information), the server 1400 may determine that the album 1300 is genuine. When the received certification information does not match the DB information (or there is no DB information that matches the received certification information), the server 1400 may determine that the album 1300 is a replica or a fake. FIG. 5 is an example of a screen representing a data table of certification data stored in the genuine product certification step. Further, FIGS. 6 and 7 respectively show exemplary screens respectively representing certification statistics by time period in the genuine product certification step. Further, FIGS. 8 and 9 respectively show exemplary screens respectively representing certification statistics by country and certification statistics by city in the genuine product certification step.

Figure 4B:
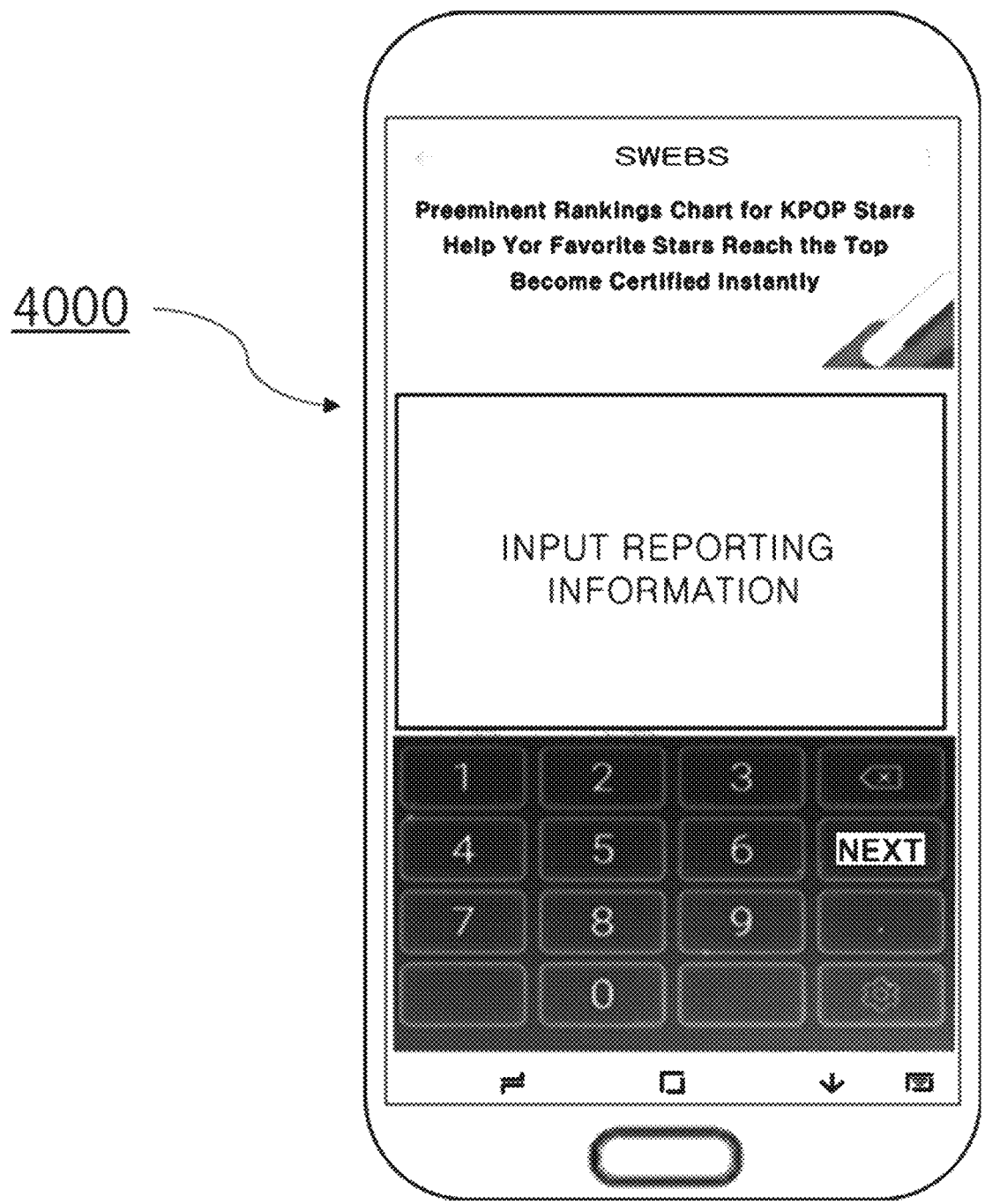
FIG. 4B is a screen displayed on a user terminal of an album buyer for reporting a replica or a fake, according to an embodiment.

In S2500, when the album 1300 is certified as a genuine product (Yes), the server 1400 may match the certification information with the album 1300, store the certification information in the database (DB), and transmit a certification completion message that indicates the certification has been completed to the terminal of the buyer 1200. However, when the album 1300 is suspected to be the replica or the fake (No), in S2450, the server 1400 may record, in the database (DB), that the album 1300 is suspected to be the replica or the fake. The server 1400 may transmit a message indicating that the album 1300 is suspected to be the replica or the fake to the terminal of the buyer 1200 and may receive reporting information from the terminal. For example, the buyer 1200 may input the reporting information via the terminal, and the reporting information may be transmitted to the server 1400. The reporting information may include a place where the buyer 1200 purchased the album 1300 suspected to be the replica/fake, a route of the purchase, time of the purchase, and the like. FIG. 4B is an example of a screen displayed on the user terminal 4000 for inputting the reporting information when the album 1300 purchased by the buyer 1200 is suspected to be the replica or the fake.

In S2500, the server 1400 may match the certification information with the album and store the matched certification information in the database (DB). The server 1400 may store, in the database (DB), the personal information (date of birth, gender, residential are, or the like) of the buyer 1200 and the information about the certification information received in S2300 together with the identification information of the album 1300. The server 1400 may match information (e.g., unique identification information) about a specific album with personal information of a buyer who purchased the specific album and store the matched information in the database (DB).

Figure 10:
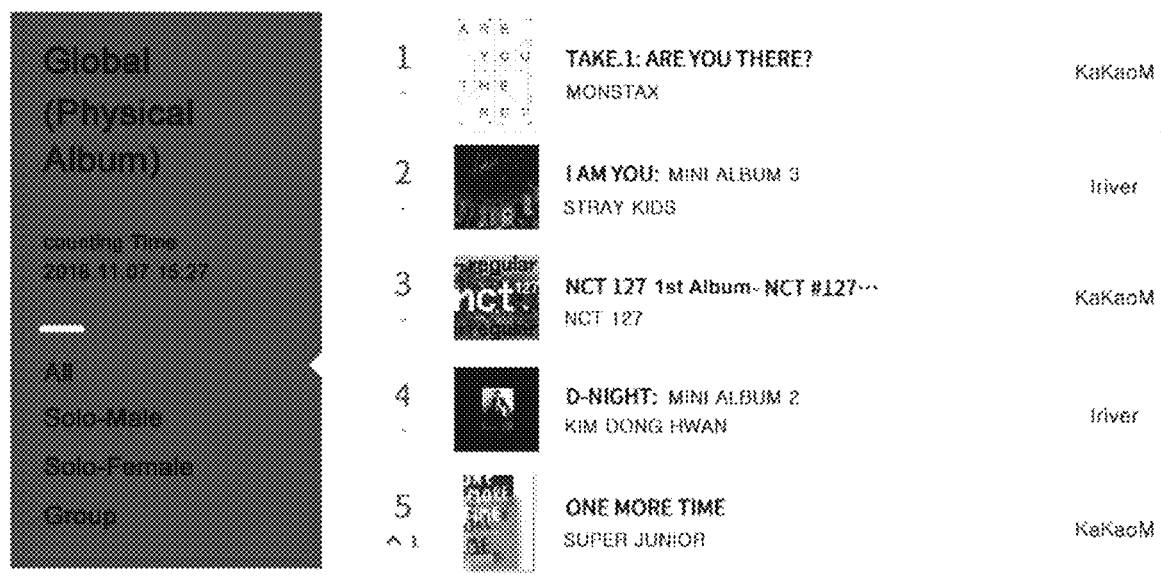
FIG. 10 illustrates a real-time ranking chart for certified albums, according to an embodiment.
Figure 11:
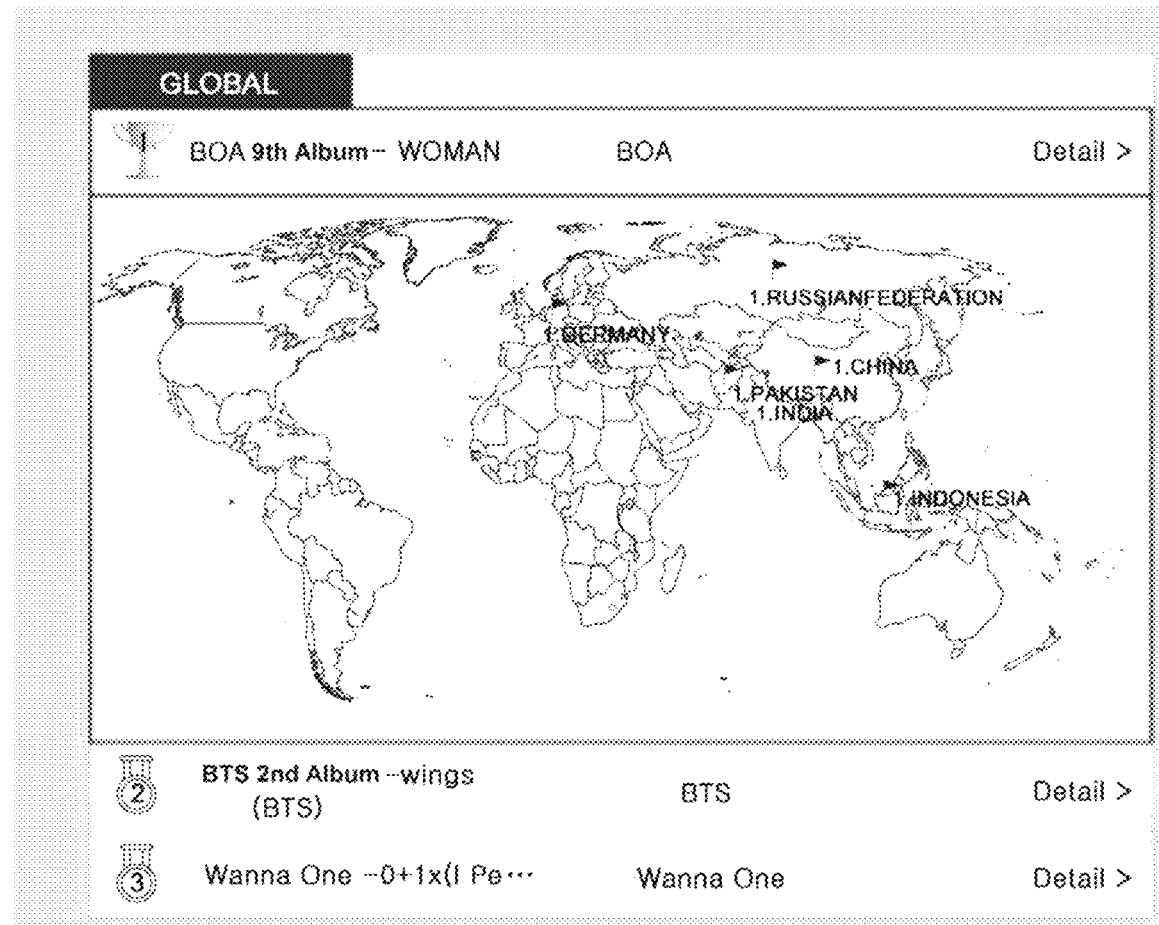
FIG. 11 illustrates a world map mapped with an album ranking, according to an embodiment.
Figure 12:
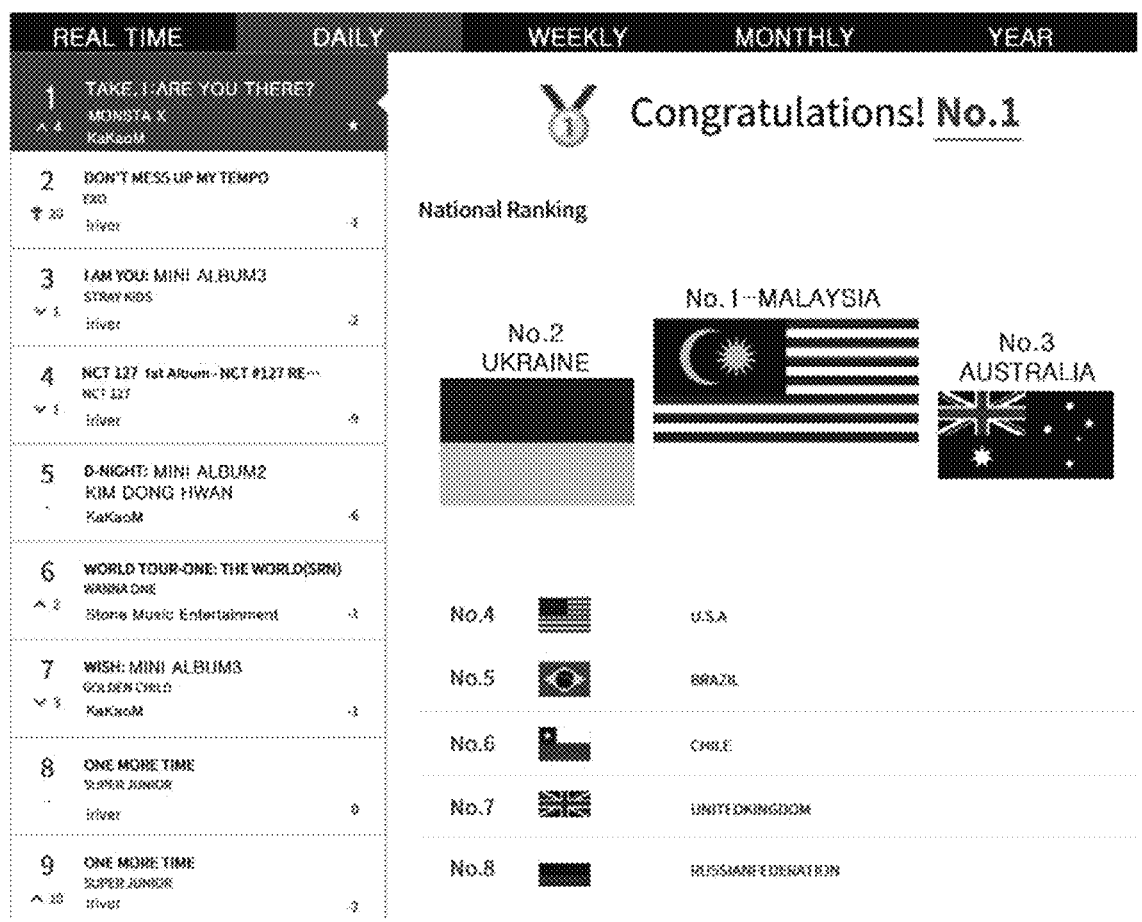
FIG. 12 illustrates a national ranking for each album, according to an embodiment.
Figure 13:
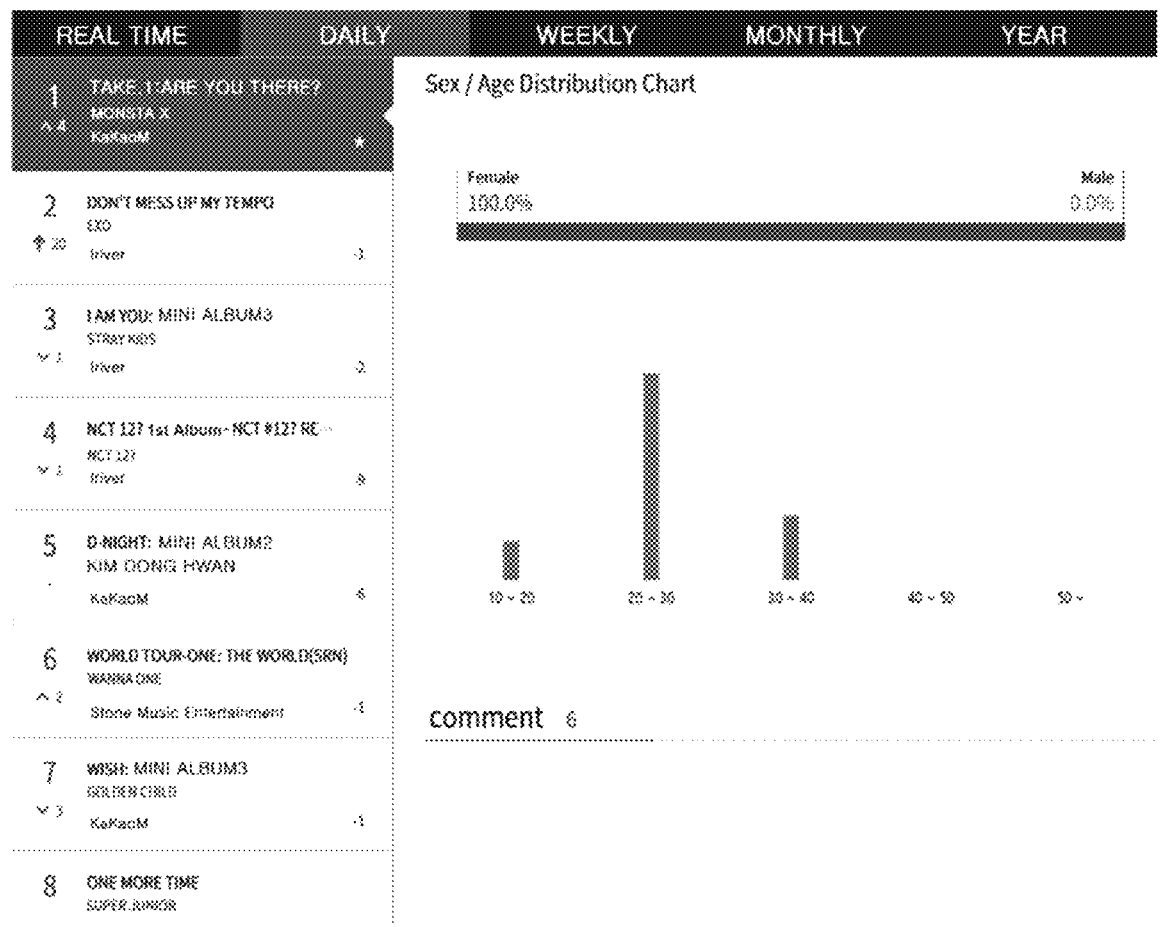
FIG. 13 illustrates statistics by gender and by age of buyers of each album, according to an embodiment.

In S2600, the server 1400 may generate a music chart based on the certification information. The server 1400 may reflect the received certification information in real time in the music chart and display the music chart. According to one embodiment, the server 1400 may generate a map marked with regions, countries, and cities of buyers who purchased an album. FIG. 10 illustrates a real-time ranking music chart for certified albums generated by the server 1400, according to an embodiment. Further, FIG. 11 is a screen representing a world map mapped with an album ranking, according to an embodiment. Further, FIG. 12 shows a national ranking for each album, according to an embodiment. In addition, the server 1400 may map each content such as an area, a country, a city, and the like for the certified album (artist) on the map, display the map mapped with the content, and display the ranking on the display screen. According to one embodiment, the server 1400 may generate analyzation results of gender distribution and age distribution of buyers who purchased the album based on the certification information. The server 1400 may arrange the genders, ages, and the like of the buyers into a music chart and display the music chart. FIG. 13 is a screen representing statistics by gender and by age of buyers of each album, according to an embodiment.

Figure 2B:
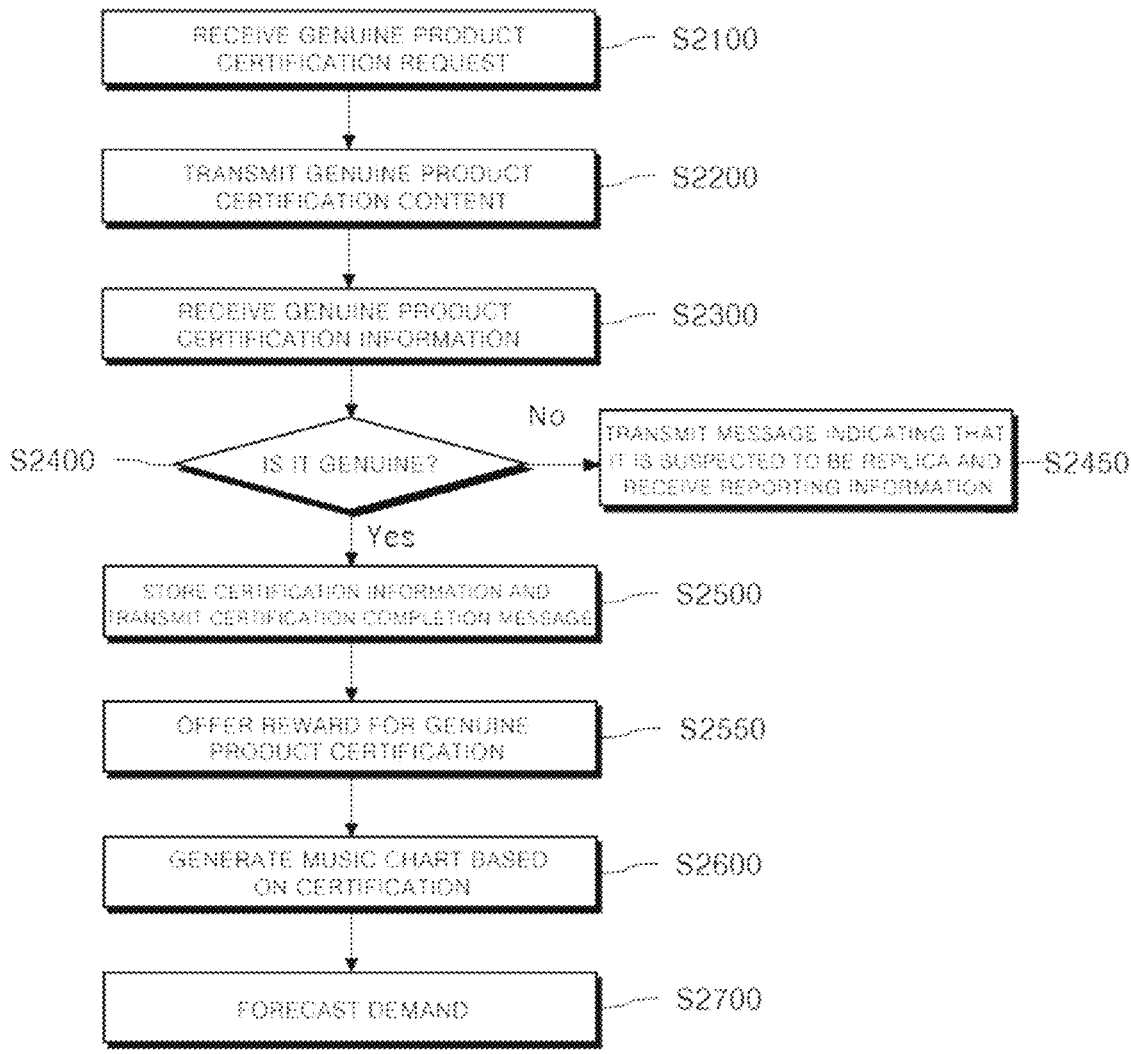

FIG. 2B illustrates a flowchart of a method for certifying a genuine product and generating a music chart performed on a server, according to an embodiment.

Referring to the flowchart of FIG. 2B, the server 1400 may further perform offering a genuine product certification reward (S2550) and demand forecasting (S2700).

In S2550, the server 1400 may offer a reward based on a corresponding album purchase to the buyer 1200 who certified the genuine product. For example, the server 1400 may transmit at least one of a new album discount coupon or a bromide paper voucher to the terminal of the buyer 1200 or transmit a message, to the terminal, indicating that a certain amount of money is saved to donate money under a name of an artist of the corresponding album. The buyer 1200 who completed the genuine product certification may download the discount coupon or points from the server 1400 to the terminal thereof. This reward or donation content may encourage purchase of the genuine product and protect the copyright. Further, this reward or donation content may spread a culture of consuming the genuine product mainly in a fandom, thereby actively nurturing and activating the copyright protection.

In S2700, the server 1400 may forecast a demand for a specific album based on data collected from the certification information. For example, the server 1400 may forecast a demand for each album by region, country, city, or the like by reflecting a past certification history for a predetermined period and information currently being certified in real time with reference to data of population, age, and gender in the corresponding region, country, and city. Such forecast information may be provided to a supplier and/or a seller, or may be shared on the central management platform.

In this connection, the album certification information and the demand forecast information may be managed in associated with POS and API systems of the seller.

Figure 14:
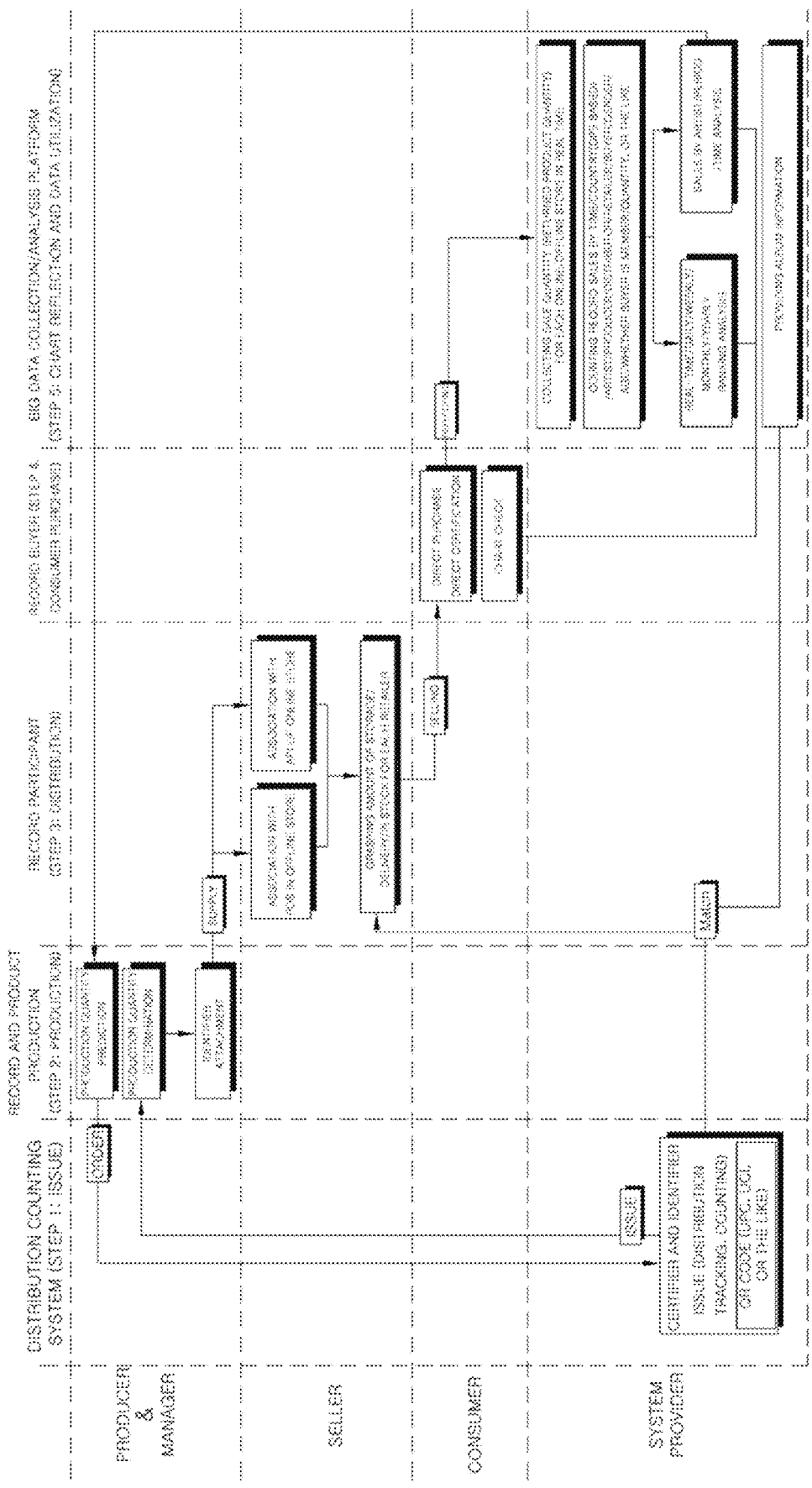
FIG. 14 illustrates a conceptual diagram of a system for collecting data of album sales and data related to the album sales, according to an embodiment.

FIG. 14 illustrates a conceptual diagram of a system for collecting data of album sales and data related to the album sales, according to an embodiment. The conceptual diagram of FIG. 14 may be a specific embodiment of the system 1000 of FIG. 1.

Referring to FIG. 14, producer & manager may predict a production quantity of a specific record and request a system provider to issue a certifier and identifier. The certifier and identifier may be used for tracking and counting of distributions. The certifier and identifier may include a QR code (UPC, UCI, and the like) but is not limited thereto.

The system provider may issue the certifier and identifier, and the producer & manager may attach the identifier to the specific album and supply the record based on the determined production quantity.

The seller may include an offline store and an online store. A consumer (record buyer) may purchase a record from the seller and request a genuine product certification for the purchased record.

The system provider may match an identifier of an album received from the consumer (record buyer) with the previously stored information in the database. The system provider may collect big data related to record sales and use the collected big data variously. For example, the system provider may collect a sale quantity (returned product quantity)

for each online/offline store in real time, and collect data related to record sales. According to one embodiment, the data related to the record sales may include time, country (GPS based), artist, producer, distributor, retailer, buyer, gender, age, whether the buyer is a member (member of the service provided by the server), quantity, or the like. The system provider may generate an analysis result for real-time/daily/weekly/monthly/yearly record sales ranking based on the collected record sales data and may generate an analysis result by artist/period/time. In addition, the system provider may receive amount of storage/delivery/in stock information for each retailer in association with the POS in the offline store and in association with the online store API.

The system provider or the producer & manager may utilize the big data collected via the genuine product certification variously. For example, the retailer or the record/music video management company may utilize the collected big data to forecast the demand for the album (for example, using an AI model) to manage an album inventory. When the information about the customer who actually purchased the record/music video CD product may be recognized, the record/music video management company may utilize the information about the customer usefully. The record/music video management company may identify singer preference, genre preference, composer preference, and the like by social stratum, age, gender from the customer information. Such information will be helpful when planning a new record/music video release. For example, a composer 'Kim Gil-dong' may write a new song for a singer 'Hong Gil-dong' and this song may be massively promoted to target teenagers who prefer their works.

Further, the record/music video management company may provide a special (high-class) service to the customer (the customer who actually purchased the product, a customer who are deeply interested in a specific singer, or the like) using the information about the customer who actually purchased the CD product. For example, the record/music video management company may inform the customers about trends and schedules for singers from the management company, collect opinions from the customers, and relay a concert live performance through video. The management company (or a content provider that only professionally provides a service upon request from the management companies) may provide the special service to the customers who actually purchased the record/music video CD products. As a result, great results may be achieved in the customer relationship management (CRM) and the customers may be encouraged to purchase the genuine product.

As described above, according to the method for certifying the genuine product and generating the music chart for the copyright protection of the present invention, the certification of the genuine product based on the matching resulted from the input of the unique identification information assigned to each album is reflected on the music chart. Thus, illegal replicas may be blocked from being reflected on the music chart and sales of the genuine product and resulting reflection of the genuine product on the music chart may be reliably achieved.

In addition, according to the present invention, album sales by region, country, gender, age, and the like may be identified, so that the album supplier may achieve smooth supply and improve inventory management efficiency through precise sales situation and demand forecast by scope. Further, the buyer may easily distinguish whether the product is the genuine product via the genuine product certification from the central management platform server without having to install a separate application on the user terminal, thereby giving more reliability to the buyer. Therefore, active participation of participants may be encouraged through the reward for the genuine product certification, and illegal copy or sales may be prevented to promote the copyright protection for a music file producer.

Further, according to the present invention, since the genuine product certification is performed by inputting basic information of the customer, after-sales customer management is possible. Further, the information about the customer who purchased the album may be directly and rapidly recognized and accurate sales status may be recognized. Further, information such as preferences by stratum, age, gender, and the like of the customer who actually purchased the product may be directly and rapidly recognized. Thus, the special service may be provided to efficiently perform the customer relationship management.

The above description is intended to provide exemplary configurations and operations for implementing the present invention. The technical idea of the present invention includes not only the embodiments described above but also implementations that may be obtained by simply changing or modifying the above embodiments. In addition, the technical idea of the present invention will also include implementations that may be achieved by easily changing or modifying the embodiments described above.

What is claimed is:

1. A method for certifying a genuine product and generating a music chart performed by a server, the method comprising:

receiving a genuine product certification request from a terminal of a buyer who purchased an album;

transmitting genuine product certification content for a genuine product certification procedure to the terminal in response to the genuine product certification request;

receiving certification information input to the genuine product certification content;

comparing the received certification information with information stored in a database built in advance to perform genuine product certification for the album;

matching the certification information with the album when the album is certified as a genuine product, storing the matched certification information in the database, and transmitting a certification completion message to the terminal; and generating the music chart based on the certification information, wherein the certification information includes unique identification information of the album and personal information of the buyer, and wherein the performing of the genuine product certification includes comparing the unique identification information with the information stored in the database.

2. The method of claim 1, wherein the album has a genuine product certification hologram or a QR code assigned with a unique identification number, wherein the unique identification number and the QR code are respectively covered with a scratch layer such that the unique identification number and the QR code are not exposed to outside, wherein information about the unique identification number and the QR code is stored in advance, and wherein the receiving of the genuine product certification request includes accessing, by the terminal, the server by reading the QR code using the terminal.

3. The method of claim 1, wherein the genuine product certification content is configured to input the unique identification information, a date of birth, a gender, and a region of the buyer, and
wherein the certification information is transmitted to the server via GPS communication.

4. The method of claim 1, wherein the storing of the matched certification information and the transmitting of the certification completion message to the terminal includes further storing a certification time in the database,
wherein the generating of the music chart includes reflecting the certification information on the music chart in real time and displaying the music chart.

5. The method of claim 4, wherein the generating of the music chart includes generating a map marked with regions, countries, cities of the buyers who purchased the album.

6. The method of claim 4, wherein the generating of the music chart includes generating an analyzation result of gender distribution and age distribution of the buyers who purchased the album based on the certification information.

7. The method of claim 1, further comprising forecasting a demand for the album based on data collected from the certification information,
wherein the forecasting of the demand includes forecasting a demand for the album by region, country, and city by reflecting a past certification history for a predetermined period and information currently being certified in real time with reference to data of population, age, and gender in the region, country, and city.

8. The method of claim 1, further comprising offering the buyer a reward for the genuine product certification,
wherein the offering of the reward includes transmitting at least one of a new album discount coupon or a bromide paper voucher to the terminal or transmitting a message, to the terminal, indicating that a certain amount of money is saved to donate money under a name of an artist of the corresponding album.

9. The method of claim 1, further comprising transmitting a message indicating that the album is suspected to be a replica or a fake to the terminal when the album is not certified as the genuine product and receiving reporting information.

10. A system for certifying a genuine product and generating a music chart, the system comprising:
a terminal of a buyer who purchased an album assigned with unique identification information;
a server connected to the terminal for genuine product certification of the album; and
a database storing information corresponding to the unique identification information,
wherein the unique identification information includes a genuine product certification hologram and a QR code assigned with a unique identification number,
wherein the unique identification number and the QR code respectively include a scratch layer such that the unique identification number and the QR code are not exposed to outside,
wherein the server is configured to:
receive a genuine product certification request from the terminal;
transmit genuine product certification content for a genuine product certification procedure to the terminal;
receive certification information input through the genuine product certification content;
compare the received certification information with the information stored in the database to perform genuine product certification;
match the certification information with the album when the album is certified as a genuine product and store the matched certification information in the database; and
generate the music chart based on the certification information.

11. The system of claim 10, wherein the certification information includes the unique identification number of the album, a date of birth, a gender, and a region of the buyer, and
wherein the music chart includes a map marked with regions, countries, cities of buyers who purchased the album and an analyzation result of gender distribution and age distribution of the buyers who purchased the album.

* * * * *